(12) United States Patent  (10) Patent No.: US 6,223,472 B1
Ishikawa et al.  (45) Date of Patent: May 1, 2001

(54) VEHICLE DOOR MODULE INCLUDING METALLIC ELONGATED MEMBER INCORPORATED WITHIN RESIN BASE PLATE

(75) Inventors: Kenichi Ishikawa; Hideyuki Hashimoto, both of Aichi (JP)

(73) Assignee: Asahi Glass Company Ltd., Tokyo (JP)

( * ) Notice: Subject to any disclaimer, the term of this patent is extended or adjusted under 35 U.S.C. 154(b) by 0 days.

(21) Appl. No.: 09/375,507

(22) Filed: Aug. 17, 1999

(30) Foreign Application Priority Data

Aug. 21, 1998 (JP) .................................................. 10-235832

(51) Int. Cl.$^7$ ........................................................ B60J 5/04
(52) U.S. Cl. ........................................... 49/502; 296/146.6
(58) Field of Search ............................ 49/502; 296/146.5, 296/146.6

(56) References Cited

U.S. PATENT DOCUMENTS

| | | | |
|---|---|---|---|
| 3,300,901 | * | 1/1967 | Eckel ...................................... 49/502 |
| 3,936,090 | * | 2/1976 | Aya et al. .......................... 296/146.6 |
| 4,924,630 | | 5/1990 | Lomasney et al. . |
| 4,945,682 | * | 8/1990 | Altman et al. ......................... 49/502 |
| 5,009,035 | * | 4/1991 | Kuki et al. ............................ 49/352 |
| 5,033,236 | * | 7/1991 | Szerdahelyi et al. .................. 49/502 |
| 5,251,403 | | 10/1993 | Compeau et al. . |
| 5,308,138 | | 5/1994 | Hlavaty . |
| 5,367,832 | | 11/1994 | Compeau et al. . |
| 5,379,553 | * | 1/1995 | Kimura et al. ......................... 49/502 |
| 5,417,470 | | 5/1995 | Holt . |
| 5,425,206 | | 6/1995 | Compeau et al. . |
| 5,469,668 | | 11/1995 | Heim et al. . |
| 5,535,553 | | 7/1996 | Staser et al. . |
| 5,548,930 | * | 8/1996 | Morando ................................ 49/502 |
| 5,647,171 | * | 7/1997 | Wirsing et al. ......................... 49/502 |
| 5,819,473 | | 10/1998 | Hashimoto et al. . |
| 5,855,094 | * | 1/1999 | Baudisch et al. ....................... 49/502 |
| 5,924,245 | * | 7/1999 | Manuel et al. .......................... 49/352 |
| 5,937,584 | * | 8/1999 | Salmonowicz et al. ............... 49/502 |
| 5,960,588 | * | 10/1999 | Wurm et al. ............................ 49/352 |
| 5,964,063 | * | 10/1999 | Hisano et al. .......................... 49/502 |
| 5,997,077 | * | 12/1999 | Siebels et al. ....................... 296/189 |
| 6,101,765 | | 8/2000 | Hashimoto et al. . |

\* cited by examiner

*Primary Examiner*—Daniel P. Stodola
*Assistant Examiner*—Gregory J. Strimbu
(74) *Attorney, Agent, or Firm*—Oblon, Spivak, McClelland, Maier & Neustadt, P.C.

(57) ABSTRACT

A vehicle door including a window regulator, a first sash, a second sash, and a metallic elongated member which are incorporated with a base plate as a module which is to be mounted to a door main body. The main body is provided under the window opening of the door and has a housing space configured to house a windowpane. The window regulator is configured to move the windowpane between the window opening and the housing space. Each of the first and second sashes are configured to guide a respective one of the sides of the windowpane when the windowpane is moved by the window regulator. The first and second sashes are provided in parallel with each other. The base plate extends between the first sash and the second sash and is made of a resin material in a plate-shaped form. The metallic elongated member extends between the first sash and the second sash. The window regulator is provided on the elongated member.

16 Claims, 3 Drawing Sheets

VEHICLE DOOR MODULE INCLUDING METALLIC ELONGATED MEMBER INCORPORATED WITHIN RESIN BASE PLATE

CROSS-REFERENCE TO RELATED APPLICATIONS

The present application claims priority under 35 U.S.C. §119 to Japanese Patent Application No. 10-235832, filed Jul. 21, 1998. The contents of that application are incorporated herein by reference in their entirety.

BACKGROUND OF THE INVENTION

1. Field of the Invention

The present invention relates to a vehicle door and a vehicle door module.

2. Prior Art

In general, a vehicle door includes a windowpane, a door main body, a window regulator and a sash. The windowpane opens and closes a window opening of an automobile. The door main body includes a housing space, which is provided under the window opening and which houses the windowpane. The window regulator lifts the windowpane between the window opening and the housing space. The sash comprises a first sash and a second sash, which, respectively, guide both sides of the windowpane in the housing space, and which are provided in parallel with each other.

The first sash and the second sash have a length extending from a windowpane lifting slot provided in a belt line of the door main body into the window opening. The first sash, the second sash and an upper sash extending between an upper end of the first sash and an upper end of the second sash form the sash to surround the window opening.

In the case of a so-called hardtop automobile without an upper sash, the window opening is formed at a location that is surround by the vehicle body and the belt line when the door is closed.

Parts for a vehicle door have been recently provided as a module to simplify the assembling process. An example of such a vehicle door is constructed as follows: A mounting opening is formed at an upper end, a lower end, a side end, an exterior side or an interior side of a door main body in advance. A module, which has a windowpane, a window regulator, a first sash and a second sash incorporated therewith through a base plate, is inserted into the mounting opening and is mounted to the door main body.

The base plate is made of a plate-shaped metallic material having a certain plane shape. The base plate extends between the first sash and the second sash. The base plate has door equipment, such as the window regulator, an inside door handle, a speaker, a door ratch, a room light, wire-harness, and different kinds of switches, fixed thereto.

By the way, the vehicle door is required to provide the base plate with complex uneven plane shape so as to be matched with the equipment including the window regulator provided thereat. Thus, the base plate is likely to be heavy, creating a problem in that it is difficult to reduce the weight of a door.

In order to cope with this problem, there is an idea of adopting a base plate made of resin. However, this idea creates problems in that dimensional accuracy lowers according to a change in temperature and a resin base plate has lower strength than a metallic base plate.

In a case where a resin base plate has an expansion ratio of 0.1% due to a change in temperature, an error of 1 mm is produced at the maximum when the distance between the first sash and the second sash is 1,000 mm, for instance. When the resin base plate supports a window regulator, the position of a window plate alters in the front and rear direction of an automobile to bring about malfunction in lifting the window plate and positional shifts of other equipment in some cases.

In particular, a window plate is usually formed in a curved shape, the window plate is a big part among constituent parts for a vehicle door, and the window plate has a wide sliding range. As a result, the occurrence of a positional shift of the window plate in the front and rear direction has great impact on malfunction in comparison with other equipment.

It is an object of the present invention to provide a vehicle door and a vehicle door module capable of not only making the assembling process thereof simple but also reducing the weight thereof, and improving dimensional and positional accuracy.

SUMMARY OF THE INVENTION

In order to attain the object, the present invention provides a vehicle door having a window opening provided therein, including a windowpane for opening and closing the window opening; a door main body, which is provided under the window opening, and which has a housing space for housing the windowpane; a window regulator for lifting the windowpane between the window opening and the housing space; a first sash and a second sash for respectively guiding both sides of the windowpane in the housing space, the first and second sashes provided in parallel with each other; and a base plate, which extends between the first sash and the second sash, and which is made of a resin material in a plate-shaped form; and further including a metallic elongated member extending between the first sash and the second sash, the elongated member having the window regulator carried thereon; wherein the windowpane, the window regulator, the first sash, the second sash and the elongated member are incorporated with the base plate as a unit of module, and the module is to be mounted to the door main body.

The present invention also provides a vehicle door module as a unit, having vehicle door equipment incorporated therewith to be mounted to a vehicle door main body, including a windowpane for opening and closing a window opening in a vehicle door; a window regulator for lifting the windowpane between the window opening and a housing space, the housing space housing the windowpane in the vehicle door main body; a first sash and a second sash for respectively guiding both sides of the windowpane, the first and second sashes provided in parallel with each other; and a base plate, which extends between the first sash and the second sashes, and which is made of a resin material in a plate-shaped form; and further including a metallic elongated member extending between the first sash and the second sashes, the elongated member having the window regulator carried thereon; wherein the windowpane, the window regulator, the first sash, the second and the elongated member are incorporated with the base plate as a unit of module.

In the vehicle door and the vehicle door module thus constructed, the metallic elongated member extends between the first sash and the second sash, and the base plate is made of a resin material. This arrangement can not only reduce the weight of the vehicle door and the vehicle door module in comparison with adoption of a metallic base plate, but also ensure required strength, and can reduce extension due to a change in temperature, in particular a change in dimension of the entire module in a front and rear direction of an automobile.

In accordance with the vehicle door and the vehicle door module according to the present invention, the window regulator is carried on the elongated member. By this arrangement, the windowpane can be smoothly and reliably lifted since the base plate is hardly susceptible to deformation due to the lifting of the windowpane. Even if the base plate is extended or shrunk by a change in temperature, the windowpane can be prevented from shifting in a front and rear direction thereof since the window regulator is carried on the elongated member.

In the vehicle door and the vehicle door module, it is preferable that the first sash, the second sash and the elongated member are provided in a substantially H-character shaped arrangement. The malfunction in lifting the windowpane is influenced by lack of dimensional stability in the front and rear direction thereof. The extension and the shrinkage of the resin base plate in the front and rear direction due to a change in temperature is apt to create the malfunction in lifting the windowpane. The provision of the first sash, the second sash and the elongated member in a substantially H-character shaped arrangement can contribute to effectively prevent the resin base plate from extending or shrinking in the front and rear direction and the windowpane from malfunctioning in the lift movement due to extension or shrinkage of the resin base plate in the front and rear direction.

In the vehicle door and the vehicle door module, it is preferable that the elongated member has an average cross-sectional area of 20–200 mm$^2$. By providing the elongated member with an average cross-sectional area of not less than 20 mm$^2$, the resin base plate can be effectively prevented from extending or shrinking in the front and rear direction thereof, and even if the resin base plate is extended or shrunk in the front and rear direction, the windowpane can be prevented from malfunctioning in the lift movement. By providing the elongated member with an average cross-sectional area of not greater than 200 mm$^2$, the vehicle door or the vehicle door module can be prevented from having an increased weight. The elongated member may have a cross-sectional shape formed in a constant size or different sizes along a longitudinal direction thereof. The average cross-sectional area of the elongated member means the average value of the areas of respective cross-sections cut by planes perpendicular to the longitudinal direction. Auxiliary parts of the elongated member, which project from a main part thereof for fixing with the first sash, the second sash and another member, may not be considered in the calculation of the average cross-sectional area of the elongated member. The main part of the elongated member means a part that can contribute to prevent the windowpane from malfunctioning in the lift movement due to the extension and the shrinkage of the resin base plate in the front and rear direction.

In the vehicle door and the vehicle door module, it is preferable that the first sash, the second sash and the upper sash provide a sash to surround the window opening. In this case, the first sash and the second sash have a length extending from the housing space into the window opening, and the upper sash extends between the leading edges of the first sash and the second sash. Thus, the windowpane can be smoothly lifted without jarring in the front and rear direction or interior and exterior direction.

In the vehicle door and the vehicle door module, it is preferable that the window regulator includes a bracket to be fixed to the windowpane, a guide extending along a lifting direction of the windowpane and slidably guiding the bracket, a pair of pulleys provided at both ends of the guide, and a looped wire entrained about the pulleys, the wire having both ends coupled through the bracket, and the wire is driven about the pulleys by a driver to lift the bracket along the guide.

Since the window regulator is a wire type regulator, the vehicle door and the vehicle door module thus constructed can reduce the weight thereof in comparison with the provision of a single arm type regulator, an X-character shaped arm type regulator, a parallel arm type regulator or another type regulator as the window regulator. Because the wire type regulator permits to arbitrarily determine where to locate the driver, a degree of freedom in designing can be increased with respect to mounting locations of the equipment to the vehicle door and the vehicle door module and with respect to the shape of the door main body.

In the vehicle door, it is preferable that the elongated member and an upper edge of the housing space support the guide. In this vehicle door, the distance between the elongated member and the upper edge of the housing space is shorter than the vertical dimension of the door main body when the elongated member extends between the first sash and the second sash to be provided in a substantially H-character shaped arrangement. In other words, since the windowpane has a lower end located at a lower position than the supported position of the guide when the windowpane is partially opened, it is minimized that the windowpane shifts in the interior and exterior direction.

In the vehicle door and the vehicle door module, it is preferable that the elongated member is incorporated into the base plate so as to extend between the first sash and the second sash in the base plate. The vehicle door and the vehicle door module thus constructed can enhance ease in molding and improve strength required for mounting the elongated member to the base plate since the metallic elongated member is incorporated into the base plate.

In the specification, words representing a direction or a relative position, such as "upper", "lower", "front", "rear", "exterior" and "interior", correspond to the direction or the relative location that are given when the vehicle door according to the present invention is assembled to a vehicle.

PREFERRED EMBODIMENTS

Figure 1:
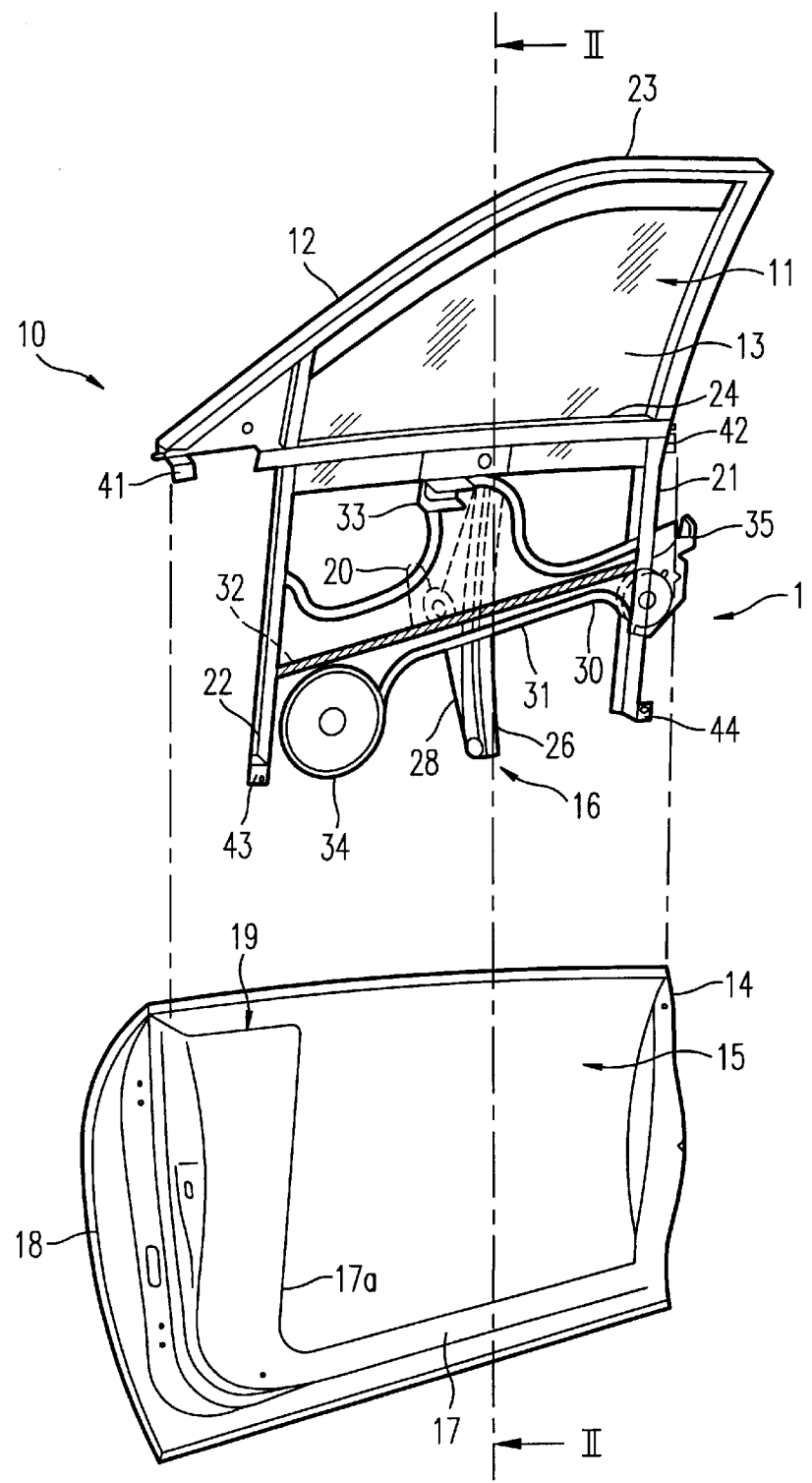
FIG. 1 is an exploded perspective view of an example of the vehicle door according to the present invention.
Figure 2:
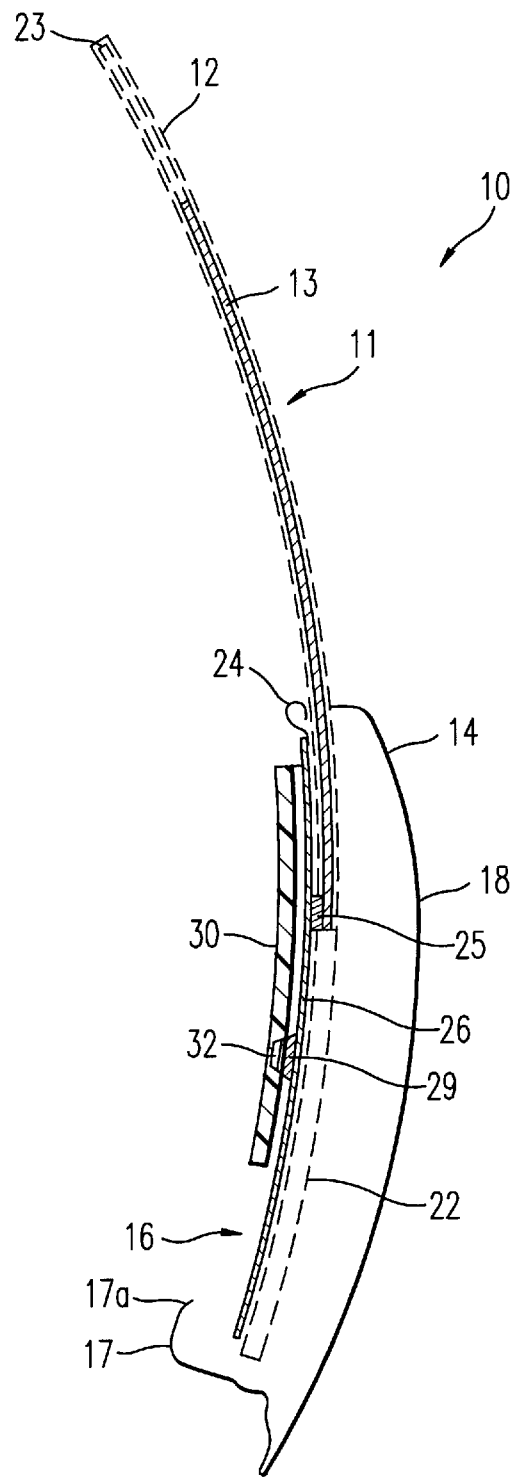
FIG. 2 is a vertical cross-sectional view of the example of the vehicle door according to the present invention.

Now, embodiments according to the present invention will be described in detail in reference to the drawings. In FIGS. 1 and 2 is representatively a door for a right front seat of an automobile as one example of the vehicle door according to the present invention.

The vehicle door 10 is configured to include a door main body 14 swinging with respect to a bodywork for performing opening and closing actions, and a module 1. The door main body 14 is provided under a window opening 11 stated later.

The module 1 has a base plate 30 stated later, a metallic elongated member 32, a sash 12 defining the window opening 11 of the automobile, a windowpane 13 for opening and closing the window opening 11, a window regulator 16 for lifting the windowpane 13 between the window opening 11 and a housing space 15 in the door main body 14, and other equipment incorporated therewith. The vehicle door 10 is provided by mounting the module 1 to the door main body 14.

The sash 12 includes a first sash 21, a second sash 22 and an upper sash 23. The first sash 21 extends along a center pillar of the bodywork and into the housing space 15 of the door main body 14. The second sash 22 is provided in parallel with the first sash 21 and extends into the housing space 15 of the door main body 14. The upper sash 23 extends between an upper edge of the first sash 21 and an upper edge of the second sash 22 along a front pillar and a roof rail of the bodywork. A belt line mole 24 extends along a belt line of the bodywork between the first sash 21 and the second sash 22.

The first sash 21, the second sash 22, the upper sash 23 and the belt line mole 24 are formed in bent shapes so as to match with the design of the bodywork. The window opening 13 is located in a substantially trapezoid frame, which is defined by the first sash 21, the second sash 22, the upper sash 23 and the belt line mole 24.

The first sash 21, the second sash 22 and the upper sash 23 have cross-sections thereof formed in a substantially U-character shape (an angular U-character shape) so that the sashes are engageable with both side edges and an upper edge of the windowpane 13. The belt line mole 24 is provided so as to sandwich the first sash 21 and the second sash 22 therein.

The windowpane 13 is a substantially trapezoid glass plate as viewed in a plan view so as to be matched with the window opening 11, and is formed in a bent shape so as to provide an arc surface or a spherical surface according to the design of the bodywork. The windowpane 13 is formed so as to have a lower edge thereof located at a lower position than the belt line mole 24 when the window opening 11 is closed. The windowpane may be made of a single glass plate, laminated glass with two or more of glass plates laminated, a transparent resin plate, and another plate.

The door main body 14 includes an inner panel 17 seen on the front side in FIG. 1, and an outer panel 18 mounted to an exterior side of the inner panel 17 (the side thereof seen on the rear side in FIG. 1). The door main body 14 has an upper edge formed with an inserting opening 19. The space between the inner panel 17 and the outer panel 18 serves as the housing space 15 in an envelope-shaped form. The inner panel 17 has a central region formed with a cut-out portion 17A, which communicates with the inserting opening 19.

Figure 3:
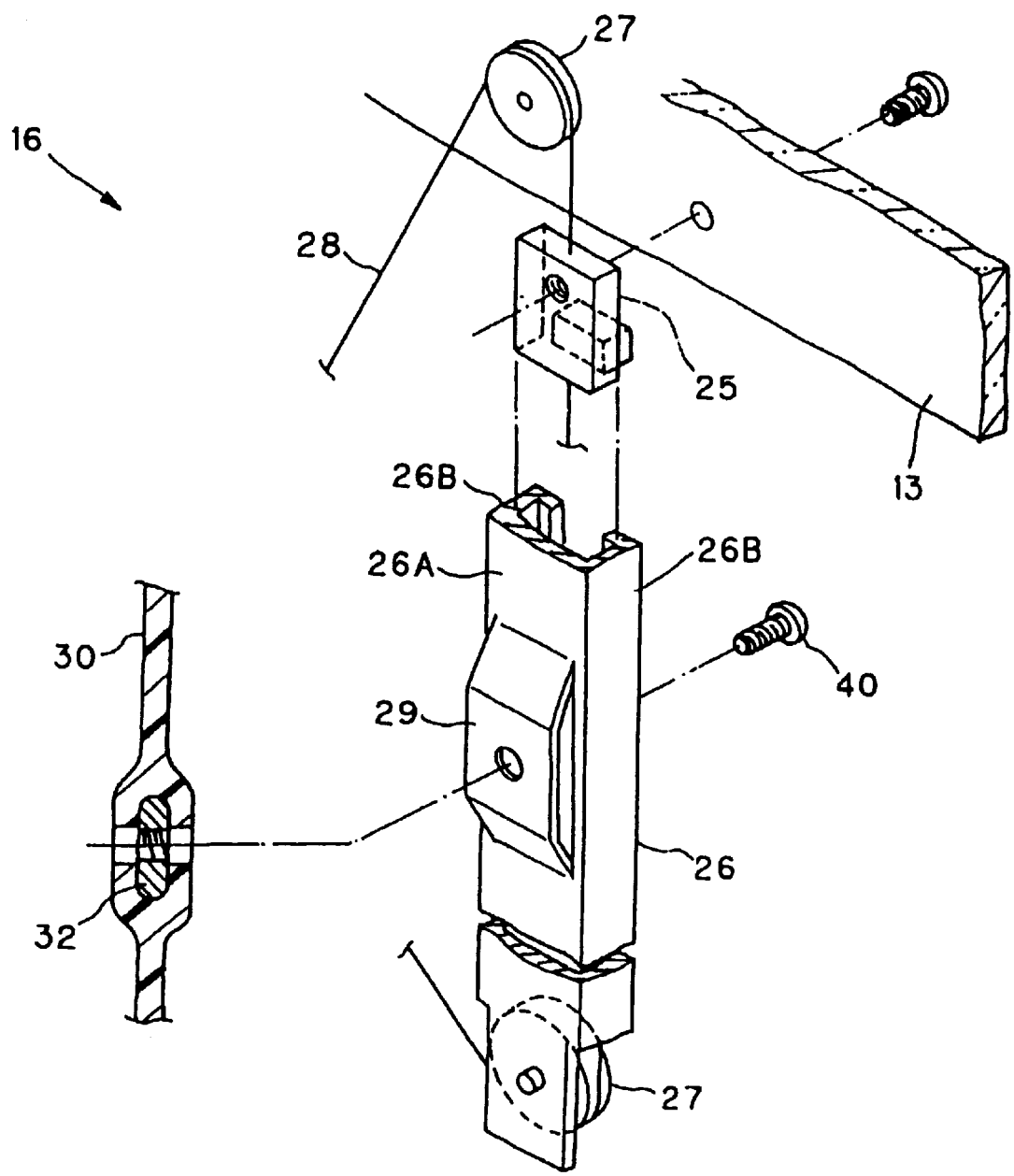
FIG. 3 is an exploded perspective view of an example of the window regulator according to the present invention.

The window regulator 16 is a wire type regulator, which includes a bracket 25, a guide 26, a pair of pulleys 27, 27, and a looped wire 28 (see FIG. 3). The bracket 25 is fixed to a lower portion of the windowpane 13. The guide 26 extends along the lifting direction of the windowpane 13 and slidably guides the bracket 25. The paired pulleys 27, 27 are provided on both ends of the guide 25. The looped wire 28 has both ends coupled through the bracket 25 and is entrained about the respective pulleys 27, 27.

The guide 26 includes a web 26A and flanges 26B so as to provide a section in a substantially C-character shape (an angular C-character shape). The web 26A has a substantially central portion in a longitudinal direction thereof formed with a ridge 29 in a table-shaped form. The window regulator 16 lifts the windowpane 13 through the bracket 25 by causing a driver 20 with an electric motor (see FIG. 1) to entrain the wire 28 about the pulley.

Now, referring to FIGS. 1 and 2, the base plate 30, which extends between the first sash 21 and the second sash 22, has for example, the sash 12, an inside door handle 33, a speaker 34, a door latch 35, a room light, a wire-harness and different kinds of switches, incorporated therewith.

The base plate 30 is provided with the metallic elongated member 32, which is formed in a bar shape or a belt shape. The elongated member 32 extends between the first sash 21 and the second sash 22 at a location under the belt line mole 24. The first sash 21, the second sash 22 and the elongated member 32 are provided in a substantially H-character shaped arrangement.

The base plate 30 is made of a resin material and is formed in such an uneven plane shape so as to match with mounting locations for the guide 26 and the driver 20 of the window regulator 16. The base plate 30 has a peripheral edge thereof provided with a reinforcing rib 31.

The guide 26 has the central portion in the longitudinal direction carried on the elongated member 32. The guide 26 has an upper end seen in the figures supported by the belt line mole 24.

In the shown example, the elongated member 32 is incorporated into the base plate 30. By this arrangement, the window regulator 16 is supported by the elongated member 32 and eventually by the base plate 30. The elongated member 32 may be incorporated into the base plate 30 by carrying out insert molding when the base plate 30 is molded.

The guide 26 has the central portion carried on the elongated member 32 by passing a fixing bolt 40 through the ridge 29 and screwing the bolt into the elongated member (see FIG. 3). Since this arrangement prevents the head of the fixing bolt 40 from projecting from the web 26A toward the brackets 26B, there is no possibility that the fixing bolt works as a bar to the movement of the bracket 25 sliding along the guide 26.

As explained earlier, the base plate 30 extends between the first sash 21 and the second sash 22. In addition, the elongated member 32 also extends between the first sash 21 and the second sash. The elongated member 32 has the window regulator 16 carried thereon, and the window regulator 16 has the windowpane 13 carried thereon. Thus, the first sash 21, the second sash 22, the elongated member 32, the windowpane 13, the window regulator 16 and other door equipment are incorporated with the base plate 30 to provide the module 1 as one unit.

Next, an assembling process for the automobile door 10 according to the example will be explained.

First, the base plate 30 is located so as to extend between the first sash 21 and the second sash 22. The equipment, such as the guide 26 and the driver 20 of the window regulator 16, the inside door handle 33, the speaker 34, the door ratch 35, the room light, the wire-harness, and different kinds of switches, are fixed at certain locations on the base plate 30.

At that time, the windowpane 13 is located between the first sash 21 and the second sash 22, and the bracket 25 of the window regulator 16 is fixed to the lower portion of the windowpane 13. Thus, the module 1 is provided with different kinds of equipment to be assembled to the automobile door 10 incorporated with the base plate 30.

Next, a lower portion of the first sash 21 and the lower portion of the second sash 22 are inserted from above into the inserting opening 19 of the door main body 14 to locate the window regulator 16 and the equipment in the housing space 15. A first mounting part 41 that is provided at an end of the upper sash 23 and a second mounting part 42 that is provided at the intersection of the first sash 21 and the belt line mole 24 are fixed to an edge of the inserting opening 19. A third mounting part 43 that is provided at a lower end of the second sash 22 and a fourth mounting part 44 that is provided at a lower end of the first sash 21 are fixed to a lower edge of the inner panel 17. The module 1 is thus mounted to the door main body 14 to assemble the automobile door 10 with a complex operating process eliminated.

A door trim (not shown) is mounted to an interior side of the inner panel 17 so as to conceal the cut-out portion 17A, thus completing the automobile door 10.

In the automobile door 10 with the module 1 provided therein, the metallic elongated member 32 extends between the first sash 21 and the second sash 22, and the base plate 30 is made of a resin material. This arrangement can reduce the weight of the module 1 and the automobile door 10 in comparison with the provision of a metallic base plate. In addition, the module 1 and the automobile door 10 can ensure required strength, and can reduce extension or shrinkage due to a change in temperature, in particular a change in dimension of the entire module 1 in a front and rear direction of the automobile. The first sash 21, the second sash 22 and the elongated member 32 can be provided in a substantially H-character shaped arrangement to reduce a change in dimension of the entire module 1 in the front and rear direction of the automobile.

In accordance with the automobile door with the module 1 provided therein, the base plate 30 is hardly susceptible to deformation due to the lifting of the windowpane 13 since the guide 26 of the window regulator 16 is carried on the elongated member 32. Thus, the windowpane 13 can be smoothly and reliably lifted. Even if the base plate 30 is extended or shrunk by a change in temperature, the windowpane 13 can be prevented from shifting in the front and rear direction since the guide 26 of the window regulator is carried on the elongated member 32.

In the automobile door 10 stated earlier, the first sash 21 and the second sash 22 extend from the housing space 15 to provide the window opening 11 together with the upper sash 23. Thus, the windowpane 13 can be smoothly lifted without jarring in the front and rear direction or interior and exterior direction of the automobile.

The window regulator 16 in the automobile door 10 with the module 1 provided therein is a wire type regulator. This arrangement can reduce the weight of the module 1 and the automobile door 10 in comparison with the provision of a single arm type regulator, an X-character shaped arm type regulator, a parallel arm type regulator or another type regulator as the window regulator. In particular, a degree of freedom in designing can be increased with respect to mounting locations of the equipment in the automobile door 10 and with respect to the shape of the door main body since the wire type regulator permits to arbitrarily determine where to locate the driver 20.

In accordance with the automobile door 10 with the module 1 provided therein, the central portion of the guide 26 in the longitudinal direction is carried on the elongated member 32 of the base plate 30, and the upper end of the guide 26 is supported by the belt line mole 24. Since the windowpane 13 has a lower end located at a lower position than the supported position of the guide 26 when the windowpane 13 is partially opened, it is minimized that the windowpane 13 shifts in the interior and exterior direction.

In accordance with the automobile door 10 with the module 1 provided therein, it is possible to enhance ease in molding and to improve strength required for mounting the elongated member 32 to the base plate 30 since the metallic elongated member is incorporated into the base plate 30.

The vehicle door and the vehicle door module according to the present invention cannot be limited to the embodiment stated earlier but can be subjected to appropriate modification and improvement. For example, the elongated member may be fixed to a surface of the base plate without being incorporated into the base plate. The elongated member may be mounted to the first sash and the second sash incorporated into the base plate without being directly fixed to the base plate.

The extending position of the elongated member between the first sash and the second sash may be determined at a position that can prevent the windowpane from malfunctioning in the lifting movement. The elongated member may extend at a position under the window opening, such as a position connecting between an upper portion, a central portion or a lower portion of the first sash and an upper portion, a central portion or a lower portion of the second sash. The selection of the central portion of the first sash and the central portion of the second sash corresponds to the example in the embodiment wherein the H-character shaped arrangement is provided. When the lower portion of the first sash and the upper portion of the second sash are selected, or when the upper portion of the first sash and the lower portion of the second sash are selected, the elongated member is located on a diagonal line of the housing space.

It is preferable that the elongated member is located at the position connecting the central portion of the first sash and the central portion of the second sash among appropriately selective positions of the elongated member under the window opening. The reason is as follows: In order to smoothly lift the windowpane, it is crucial that the first sash, the second sash and the window regulator do not shift the positions thereof. For the purpose, it is necessary to cope with the shrinkage of the resin base plate in the front and rear direction due to a change in temperature. On the other hand, it is preferable that the resin base plate extends between the first sash and the second sash so as to cover a substantially central region of the housing space. From this viewpoint, it is preferable that the elongated member is located at the same position as the resin base plate, i.e., the elongated member is located at the position connecting the central portion of the first sash and the central portion of the second sash.

When the elongated member is located at a position apart from the resin base plate among the appropriately selective positions, the elongated member is indirectly fixed to the resin base plate.

Even when the elongated member is incorporated into a base plate surface (an interior side or an exterior side of the base plate), or even when the elongated member is not directly fixed to the base plate, the window regulator per se is fixed to the elongated member. The reason is that the positional accuracy of the windowpane depends on the window regulator since the windowpane is mounted to the window regulator. Since the window regulator is carried on the elongated member, the window regulator has improved positional accuracy without being influenced by extension or shrinkage due to a change in temperature. Thus, the positional accuracy of the windowpane per se can be improved to smoothly lift the windowpane.

As stated earlier, it is important that the window regulator according to the present invention is carried on the elongated member, and whether the window regulator is fixed to and carried on both of the elongated member and the base plate, or the elongated member only, is determined, depending on how the elongated member is mounted to the base plate. From viewpoints, such as ease in molding, and strength required for mounting elongated member to the base plate, it is preferable that the elongated member is incorporated into the base plate, and eventually that the window regulator is carried on both of the elongated member and the base plate as in the example stated earlier.

The elongated member may be formed so as to have a constant cross-section in the longitudinal direction or different cross-sections in the longitudinal direction. Examples of the shape of the elongated member are a rod form, a cylindrical form, a band form, a band form with a rib provided thereon (a substantially C-character form in an angular cross-section), a substantially L-character shaped cross-sectional form, and a substantially M-character shaped cross-sectional shape.

As the window regulator, various kinds of regulators, such as a single arm type regulator, an X-arm type regulator, a parallel arm type regulator, and a rack and pinion type regulator, are applicable in place of the wire type of regulator used in the example. The wire type regulator is preferably used from the viewpoint that a degree of freedom in designing can be increased with respect to the mounting locations of the equipment and with respect to the shape of the door main body, and the viewpoint that the weight of the entire door can be reduced.

The vehicle door and the vehicle door module according to the present invention are used, being mounted to various kinds of vehicles, such as an ordinary automobile and a truck. Since the vehicle door and the vehicle door module according to the present invention can provide a door capable of not only reducing the weight thereof but also making the assembling process simple, and improving dimensional and positional accuracy, it is preferable that the vehicle door and the vehicle door module according to the present invention is mounted to and utilized in a vehicle producible in mass production, in particular a typical automobile.

Obviously, numerous modifications and variations of the present invention are possible in light of above teaching. It is therefore to be understood that within the scope of the appended claims, the invention may be practiced otherwise than specifically described herein.

What is claimed is:

1. A vehicle door comprising:
   a window opening:
   a windowpane;
   a door main body which is provided under the window opening and which has a housing space configured to house the windowpane;
   a window regulator configured to move the windowpane between the window opening and the housing space;
   a first sash and a second sash each of which is configured to guide a respective one of the sides of the windowpane when the windowpane is moved by the window regulator, the first and second sashes being provided in parallel with each other; and
   a base plate which extends between the first sash and the second sash and which is made of a resin material in a plate-shaped form; and
   a metallic elongated member disposed within the base plate and extending between the first sash and the second sash, the window regulator being directly connected to the elongated member;
   wherein the windowpane, the window regulator, the first sash, the second sash and the elongated member are incorporated with the base plate as a module which is to be mounted to the door main body.

2. The vehicle door according to claim 1, wherein the window regulator includes a bracket to be fixed to the windowpane, a guide extending along a moving direction of the windowpane and slidably guiding the bracket, pulleys provided at ends of the guide, and a looped wire entrained about the pulleys, the wire being coupled to the bracket, and the wire is driven about the pulleys by a driver to move the bracket along the guide.

3. The vehicle door according to claim 2, wherein the guide is supported by the elongated member and an upper edge of the housing space.

4. The vehicle door according to claim 1, wherein the first sash, the second sash and the elongated member are provided in a substantially H-character shaped arrangement.

5. The vehicle door according to claim 4, wherein the elongated member has an average cross-sectional area of 20–200 mm$^2$.

6. The vehicle door according to claim 4, wherein the window regulator includes a bracket to be fixed to the windowpane, a guide extending along a moving direction of the windowpane and slidably guiding the bracket, pulleys provided at ends of the guide, and a looped wire entrained about the pulleys, the wire being coupled to the bracket, and the wire is driven about the pulleys by a driver to move the bracket along the guide.

7. The vehicle door according to claim 6, wherein the guide is supported by the elongated member and an upper edge of the housing space.

8. The vehicle door according to claim 1, wherein the elongated member has an average cross-sectional area of 20–200 mm$^2$.

9. The vehicle door according to claim 1, wherein the first sash and the second sash extend from the housing space into the window opening, and an upper sash extends between leading edges of the first sash and the second sash.

10. A vehicle door module which is to be mounted to a vehicle door main body having a housing space, comprising:
    a windowpane;
    a window regulator configured to move the windowpane between a window opening and the housing space;
    a first sash and a second sash each of which is configured to guide a respective one of the sides of the windowpane when the windowpane is moved by the window regulator, the first and second sashes being provided in parallel with each other; and
    a base plate which extends between the first and second sashes and which is made of a resin material in a plate-shaped form; and
    a metallic elongated member disposed within the base plate and extending between the first sash and the second sash, the window regulator being directly connected to the elongated member;
    wherein the windowpane, the window regulator, the first sash, the second sash and the elongated member are incorporated with the base plate as the vehicle door module.

11. The vehicle door module according to claim 10, wherein the first sash, the second sash and an upper sash extending between leading edges of the first sash and the second sash provide a frame surrounding the window opening.

12. The vehicle door module according to claim 10, wherein the first sash, the second sash and the elongated member are provided in a substantially H-character shaped arrangement.

13. The vehicle door module according to claim 12, wherein the elongated member has an average cross-sectional area of 20–200 mm².

14. The vehicle door module according to claim 12, wherein the window regulator includes a bracket to be fixed to the windowpane, a guide extending along a moving direction of the windowpane and slidably guiding the bracket, pulleys provided at ends of the guide, and a looped wire entrained about the pulleys, the wire being coupled to the bracket, and the wire is driven about the pulleys by a driver to move the bracket along the guide.

15. The vehicle door module according to claim 10, wherein the elongated member has an average cross-sectional area of 20–200 mm².

16. The vehicle door module according to claim 10, wherein the window regulator includes a bracket to be fixed to the windowpane, a guide extending along a moving direction of the windowpane and slidably guiding the bracket, pulleys provided at ends of the guide, and a looped wire entrained about the pulleys, the wire being coupled to the bracket, and the wire is driven about the pulleys by a driver to move the bracket along the guide.

* * * * *